United States Patent [19]

Ninomiya et al.

[11] Patent Number: 5,089,307

[45] Date of Patent: Feb. 18, 1992

[54] EDIBLE FILM AND METHOD OF MAKING SAME

[75] Inventors: Hirofumi Ninomiya; Shoji Suzuki; Kazuhiro Ishii, all of Toyama, Japan

[73] Assignee: Mitsubishi Rayon Co., Ltd., Tokyo, Japan

[21] Appl. No.: 526,735

[22] Filed: May 22, 1990

[30] Foreign Application Priority Data

May 23, 1989 [JP] Japan ................................. 1-129386
May 24, 1989 [JP] Japan ................................. 1-131024
May 25, 1989 [JP] Japan ................................. 1-132356
Dec. 8, 1989 [JP] Japan ................................. 1-319440

[51] Int. Cl.$^5$ ..................... B29D 22/00; A21D 13/00
[52] U.S. Cl. .................................. 428/35.2; 426/138; 536/1.1; 106/162; 106/205
[58] Field of Search ............... 426/138, 206, 115, 573, 426/578; 428/35.2; 536/1.1; 106/162, 205

[56] References Cited

U.S. PATENT DOCUMENTS 4,851,394  7/1989  Kubodera ..................... 514/54

Primary Examiner—James J. Seidleck
Assistant Examiner—Charles R. Nold
Attorney, Agent, or Firm—Armstrong, Nikaido, Marmelstein, Kubovcik & Murray

[57] ABSTRACT

Disclosed are heat-sealable edible films comprising at least a film layer containing a water-soluble polysaccharide as the principal component, or comprising at least (a) a film layer as described above and (b) a subfilm layer containing an alkali metal salt of casein, soybean protein or a combination of soybean protein and gelatin, as the principal component. Preferably, the water-soluble polysaccharide is composed chiefly of carrageenan and the film layer additionally contains a polyhydric alcohol. These edible films are useful in sealing or packaging powdery foods, granular foods, dry solid foods, oily foods and the like.

11 Claims, No Drawings

EDIBLE FILM AND METHOD OF MAKING SAME

BACKGROUND OF THE INVENTION

1. Field of the Invention

This invention relates to heat-sealable edible films which can be used as sealing and packaging materials for dried foods, oily foods and the like, as well as processes for producing such films.

2. Description of the Prior Art

Generally, the powdered soup, flavoring oil, dried vegetables and other ingredients of precooked noodles and cup noodles are packaged to maintain their qualities and forms. The packaging materials used for this purpose include, for example, aluminum-polyethylene laminate, cellophane-polyethylene laminate and various plastic films.

In the case of cup noodles, dried vegetables and other ingredients may be added in an unpackaged state.

However, where powdered soup, flavoring oil, dried vegetables and the like are added in a packaged state, the packages must be torn to remove the contents prior to cooking. This is not only troublesome, but also has the disadvantage that the contents tend to be spilled at the time of tearing the packages, especially when they are in powder or liquid form.

Where such contents are added in an unpackaged state, this is disadvantageous, not only in that their flavors are lost easily and it is difficult to maintain their qualities, but also in that the maintenance of their forms is interfered with. Specifically, when cup noodles are shaken during transportation or handling, the ingredients and the like tend to migrate to the bottom of the cup. As a result, the consumer cannot recognize the presence of ingredients on removal of the cover.

One solution to these problems is to package such contents with an edible film. Thus, their qualities and forms can be maintained during transportation and storage. If the packaging material is soluble in hot water, the package can be dissolved simply by pouring hot water over it, thus making it unnecessary to tear the package. If not, the packaging material can be eaten together with the contents. Accordingly, it is highly desirable to package the contents with such a material.

Such a material must have sufficient film strength so that, during packaging or handling, the package may not be torn to release its contents. Moreover, it is desired from the viewpoint of packaging operation that such a material be heat-sealable. However, conventionally known edible films, for the most part, consist essentially of a water-soluble polysaccharide or a water-soluble protein. These films have excellent edibility and oxygen barrier properties, but fail to exhibit adequate heat sealability. Specifically, some of them cannot be heat-sealed under ordinary heat-sealing conditions, and some of them can be heat-sealed, but fail to achieve a sufficient heat-seal strength. If the heat-sealing conditions are made severer to improve heat-seal strength, the film may undergo shrinkage or breakage.

In order to improve the heat sealability of edible films and thereby overcome the above-described disadvantages, a number of methods have been proposed. They include the method of forming a film from an intimate blend of amylose, an alkali metal salt of casein, and a low-molecular-weight plasticizer (Japanese Patent Laid-Open No. 112533/'76); the method of dipping a collagen film in, or coating it with, a mixture of gelatin or glue and a plasticizer (Japanese Patent Laid-Open No. 11280/'77); the method of forming a film by laminating a polysaccharide with gum arabic, pullulan, starch or gelatin (Japanese Patent Laid-Open No. 76336/'85); and the method of incorporating a solid fat in an edible film (Japanese Patent Laid-Open No. 59855/'88).

However, the films formed from an intimate blend of amylose, an alkali metal salt of casein, and a low-molecular-weight plasticizer, the films formed by laminating a polysaccharide with gum arabic, pullulan or starch, and the edible films having a solid fat incorporated therein still fail to exhibit adequate heat sealability. The films formed by laminating a collagen film or a polysaccharide with gelatin show a marked improvement in heat-seal strength, but have the disadvantage that the presence of gelatin in the surface layer causes severe blocking of films and this makes it difficult to handle the films.

Thus, there is a strong demand for an edible film having excellent heat sealability and blocking resistance.

SUMMARY OF THE INVENTION

In view of the above-described state of the art, the present inventors made an endeavor to seek an edible film having good performance as a packaging material and exhibiting excellent heat sealability and blocking resistance, and have now completed the present invention.

According to one aspect of the present invention, there are provided a heat-sealable edible film comprising at least one layer and a heat-sealable edible film comprising at least two layers. More specifically, the former edible film comprises at least a film layer consisting essentially of (a) a water-soluble polysaccharide composed chiefly of carrageenan, (b) a polyhydric alcohol and (c) water, the film layer having a water content of not greater than 25% by weight, the weight ratio of the polyhydric alcohol to the water-soluble polysaccharide being in the range from 1:5 to 1:1. The latter edible film comprises (a) a film layer containing a water-soluble polysaccharide as the principal component and (b) a subfilm layer formed on at least one surface of the film layer, the subfilm layer containing an alkali metal salt of casein, soybean protein or a combination of soybean protein and gelatin, as the principal component.

According to another aspect of the present invention, there are provided a process for producing the above-described edible film comprising at least one layer, and a process for producing the above-described edible film comprising at least two layers. More specifically, the former process comprises the steps of preparing an aqueous solution of a polyhydric alcohol in which the polyhydric alcohol and water are present in a weight ratio ranging from 0.2:99.8 to 20:80, dissolving therein a water-soluble polysaccharide composed chiefly of carrageenan, casting the resulting solution into a film, and drying the film to reduce its water content to 25% by weight or less. The latter process comprises the steps of (a) forming a film layer by preparing an aqueous solution containing a water-soluble polysaccharide at a concentration of not greater than 20% by weight, casting the aqueous solution into a film, and drying the film; and (b) forming a subfilm layer on the film layer by coating the film layer with, or dipping the film layer in, an aqueous solution containing a protein selected from the group consisting of an alkali metal salt of casein, soybean protein or a combination of soybean and gelatin, and drying the coated or dipped film layer, or by separately forming a subfilm layer containing the protein as the principal component, and bonding the subfilm layer to the film layer by means of water, an edible adhesive or heat.

According to a further aspect of the present invention, there are provided food bags for packaging various types of foods which are made by using the above-described edible films.

The edible films of present invention have are capable of heat sealing inclusive of impulse sealing, are readily soluble in hot water, and exhibit excellent strength properties and low-temperature properties. Accordingly, they are very useful as packaging materials for various instant foods such as the powdered soup, flavoring oil, dried vegetables and other ingredients of pre-cooked noodles and cup noodles, instant coffee and instant soup mixes, and as casing materials for ham and sausage.

DETAILED DESCRIPTION AND THE PREFERRED EMBODIMENTS

The edible films of the present invention comprise at least a film layer containing a water-soluble polysaccharaide as the principal component and providing the basic properties of the edible film, or comprise at least (a) a film layer as described above and (b) a subfilm layer containing a specific water-soluble protein as the principal component. The subfilm layer is not an essential element of the edible films of the present invention, but forms an important element because it is effective in improving heat sealability and, moreover, blocking resistance. Thus, in the embodiment using the subfilm layer, the film layer having desired properties can be formed by using a wider choice of materials.

Now, the film layer constituting the edible films of the present invention will be described hereinbelow.

The film layer provides the basic properties of the edible film, such as edibility, solubility in hot water, strength properties, heat sealability and blocking resistance, and contains a water-soluble polysaccharide as the principal constituent.

As used herein, the term "water-soluble polysaccharide" (hereinafter referred to as "polysaccharide") denotes polymeric compounds formed by polyglycosylation of monosaccharides and substituted derivatives thereof, and having a polymerization degree of 10 or more. More specifically, the term comprehends polysaccharides having water solubility in a broad sense, and covers polysaccharides soluble in warm water (having a temperature ranging from room temperature to 100° C.) and polysaccharides soluble in water having a pH in the range of about 2 to 12. Although no particular limitation is placed on the molecular weight, it is preferable to use a polysaccharide which has a molecular weight permitting the formation of a network by the association of molecules or by the action of electric charge and which can be formed into a film.

The polysaccharides which can be used in the present invention include, alginic acid and its salts such as sodium salt; furcellaran; carrageenan such as kappa-, iota- and lambda-carrageenans; agar; pectin such as high-methoxy and low-methoxy pectins; gums such as tamarind seed gum, xanthan gum, guar gum, tara seed gum, locust bean gum and arabinogalactan; pullulan; chitin derivatives such as chitosan; starch such as wheat, corn and potato starches; dextrin; edible water-soluble cellulose derivatives such as carboxymethylcellulose; and mixtures of the foregoing. However, from the viewpoint of film-forming properties, film properties and the like, it is preferable to use one or more polysaccharides selected from alginic acid and its salts, furcellaran, carrageenan and agar.

In some cases, strength properties or other film properties are improved by the combined use of two or more of the above-enumerated polysaccharides. For example, since carrageenan is a polyanionic polysaccharide, it undergoes a crosslinking reaction in the presence of a polycationic polysaccharide such as chitosan, and thereby forms a strong network. Thus, such a combination of polysaccharides may be suitably chosen and used according to the desired film properties.

Among the above-enumerated polysaccharides, carrageenan is particularly preferred in that it can form a film layer having excellent strength properties, heat sealability and solubility in hot water. In order to produce satisfactory effects, carrageenan should be used in an amount of not less than 20% by weight, preferably not less than 50% by weight, based on the total amount of polysaccharide used. Where the edible film of the present invention does not have a subfilm layer which will be described later, its heat sealability and blocking resistance depend solely on the properties of the film layer. In this case, it is especially preferable to use carrageenan in an amount of not less than 50% by weight based on the total amount of polysaccharide used. Of course, carrageenan may comprise 100% by weight of the polysaccharide. On the other hand, where the edible film of the present invention has a subfilm layer, its heat-sealability and, moreover, blocking resistance can be improved with the aid of the subfilm layer. In this case, therefore, the presence of carrageenan is not absolutely necessary and the film layer may be suitably formed so that the desired strength properties and the like will be obtained. For example, an edible film having good water resistance can be obtained by using agar to form the film layer.

In order to impart flexibility to the resulting film, the film layer containing a polysaccharide as the principal component may preferably contain a polyhydric alcohol as an additional component.

As used herein, the term "principal component" usually denotes a component present in an amount of not less than 50% by weight based on the total amount of active components. However, if the whole system is characterized by a certain component, that component can be considered to be the principal component. Accordingly, the expression "film layer containing a polysaccharide as the principal component" usually means that the polysaccharide is present in an amount of not less than 50% on a dry weight basis. However, the film layer can additionally contain a polyhydric alcohol as described below, in an amount less than or equal to that of the polysaccharide, as well as water-soluble proteins (such as gelatin and soybean protein), food dyes (including natural dyes such as gardenia dye, and edible synthetic dyes such as Blue Dye No. 1) and the like, in an amount less than that of the polysaccharide. In such cases, the content of the polysaccharide may consequently be less than 50% by weight.

The term "polyhydric alcohol" generally denotes alcohols formed by substituting hydroxyl groups for a plurality of hydrogen atoms of hydrocarbons. In the present invention, however, the term also comprehends monosaccharides and oligosaccharides having a polymerization degree of less than 10. Polyhydric alcohols having useful properties such as edibility and moisture retentivity include, for example, dihydric alcohols such as ethylene glycol and propylene glycol; trihydric alcohols such as glycerol; sugar alcohols such as sorbitol, mannitol, maltitol, xylitol and saccharification products of reduced starch; monosaccharides such as glucose, fructose, galactose and xylose; disaccharides such as saccharose, maltose and lactose; and oligosaccharides such as decomposition products of starch.

The above-defined polyhydric alcohol is preferably used in an amount of 0.2 to 1 part by weight per 1 part by weight of the polysaccharide (i.e., 1:5 to 1:1). In the embodiment having no subfilm layer, it is especially preferable to use the polyhydric alcohol in an amount falling within the above-described range. If the weight ratio of polyhydric alcohol to polysaccharide in the film is greater than 1, the film suffers a reduction in blocking resistance, as well as a marked reduction in strength. Moreover, the film tends to be wrinkled during its winding. On the other hand, if the weight ratio is less than 0.2, the film becomes brittle and its releasability from the carrier used for film formation tends to become poor. Among the above-enumerated polyhydric alcohols, glycerol, maltose and sorbitol are especially preferred.

The above-enumerated polyhydric alcohols may be used in admixture of two or more. Especially when a mixture of a polyhydric alcohol being liquid (or semiliquid) at room temperature and a polyhydric alcohol being solid at room temperature is used, the flexibility imparted to the film is maintained even at low temperatures ($-50°$ to $-40°$ C.). Thus, the film does not undergo crazing or the like during handling at low temperature and hence exhibits improved environmental stability. In order to improve environmental stability effectively, it is preferable that the polyhydric alcohol being liquid at room temperature and the polyhydric alcohol being solid at room temperature be used in a weight ratio ranging from 3:1 to 1:3. Examples of the polyhydric alcohol being liquid at room temperature include propylene glycol, glycerol and mixtures therof. Examples of the polyhydric alcohol being solid at room temperature include sugar alcohols such as sorbitol, mannitol, maltitol, xylitol and saccharification products of reduced starch; monosaccharides such as glucose, fructose, galactose and xylose; disaccharides such as saccharose, maltose and lactose; and oligosaccharides such as decomposition products of starch. These polyhydric alcohols may be used in admixture of two or more.

Since the water content of the film layer affects the blocking resistance, flexibility and other properties of the resulting film, it should be suitably adjusted according to the desired film properties. Specifically, if the water content is relatively high, the resulting film shows an improvement in flexibility and hence resistance to extension, but suffers a reduction in blocking resistance. On the other hand, if the water content is relatively low, the resulting film shows an improvement in blocking resistance, but suffers a reduction in flexibility and heat sealability. In this case, the use of a polyhydric alcohol as described above is preferred because its addition effectively improves the flexibility of the resulting film. Accordingly, in the embodiment using a polyhydric alcohol, the water content can be reduced to improve blocking resistance while maintaining a desirable degree of flexibility.

In the presence of a polyhydric alcohol, the water content of the film layer should preferably be not greater than 25% by weight and more preferably not greater than 20% by weight.

Now, the subfilm layer constituting the edible films of the present invention will be described hereinbelow.

The subfilm layer is laminated to the above-described film layer for the purpose of improving its heat sealability and, moreover, its blocking resistance. So far as this purpose is accomplished, the subfilm layer need not necessarily be formed on the whole surface of the film layer. Although the subfilm layer may be formed on both surfaces of the film layer, it is preferable from the viewpoint of heat-sealing operation that the subfilm layer be formed only on the sealing surface, especially when the resulting film is to be heat-sealed by means of an automatic heat sealer.

The principal component of the subfilm layer is a water-soluble protein comprising an alkali metal salt of casein, soybean protein or a combination of soybean protein and gelatin.

As used herein, the term "alkali metal salt of casein" denotes any salt of casein in which at least a part of the carboxyl groups contained in casein are combined with an alkali metal at least to such an extent as to make the casein soluble in water. Examples of the alkali metal include sodium and potassium. Specifically, the alkali metal salt of casein may comprise commercially available sodium caseinate or the like. Alternatively, at the time of formation of the subfilm layer, an alkali metal salt of casein may be produced by dissolving casein in an aqueous solution of an alkaline substance for use in foods, such as kansui.

On the other hand, not only when soybean protein alone is used as the principal component of the subfilm layer, but also when a combination of soybean protein and gelatin is used as the principal component of the subfilm layer, the resulting films have excellent heat sealability and blocking resistance. A comparison of these films has revealed that the film obtained in the former case are characterized by better blocking resistance and the films obtained in the latter case are characterized by better heat sealability. In the latter case, when gelatin is used in an amount of not greater than 80% by weight based on the combined amount of soybean protein and gelatin, the resulting film has much better blocking resistance than when the amount of gelatin used is 100%. Thus, a practically acceptable degree of blocking resistance can be imparted to the resulting film, though it depends on process requirements. The amount of gelatin used is preferably not greater than 70% by weight and more preferably not greater than 60% by weight.

The soybean protein which can be used in the present invention is any product obtained by extracting protein from whole or defatted soybeans and concentrating the extract to raise its protein content. Although no particular limitation is placed on the protein content, it is generally preferable to use a product containing more than 50% by weight of the protein derived from the raw material.

The soybean protein used in the present invention can be any commercially available powder protein derived from soybeans.

Where gelatin is additionally used in the present invention, a product of any grade can be used, provided that it is edible. Thus, commercially available powdered gelatin may suitably be used.

The subfilm layer can also contain additives such as food dyes and food flavors.

Similarly to the film layer, the subfilm layer should preferably have a water content of not greater than 25% by weight and more preferably not greater than 20% by weight. However, the water content of the subfilm layer need not be equal to that of the film layer. For example, even if the water content of the film layer is high, substantially good heat sealability can be achieved by reducing the water content of the subfilm layer.

The above-described alkali metal salts of casein have a slight characteristic milklike odor, and aqueous solutions thereof putrefy relatively fast. Thus, some restrictions are imposed on their use in the formation of a subfilm layer. However, the resulting subfilm layer has good heat sealability and relatively good flexibility and strength properties. On the other hand, the use of soybean protein substantially eliminates the above-described problems and, moreover, provides excellent blocking resistance. However, the resulting subfilm layer is slightly colored.

No particular limitation is placed on the thickness of the film layer. If the edible film of the present invention is to be used for packaging purposes, the thickness of the film layer is preferably in the range of about 10 to 100 μm from the viewpoint of impulse sealability. If the edible film of the present invention is to be heat-sealed in the usual manner, the film layer may have greater thicknesses. On the other hand, the thickness of the subfilm layer is preferably in the range of about 0.1 to 10 μm, because the main purpose thereof is to impart heat sealability and blocking resistance to the edible film of the present invention. Especially when an alkali metal salt of casein is used to form the subfilm layer, its thickness is preferably in the range of about 1 to 10 μm. Even if the subfilm layer is made thicker, no additional benefit will be obtained.

It is to be understood that the edible films of the present invention may also be formed with a separate colored layer, a gas barrier layer and/or a plurality of subfilm layers, and all such modifications fall within the scope of the present invention. It is also to be understood that the subfilm layer can independently and other properties of conventional edible films can be markedly improved by applying the subfilm layer to them.

Owing to the above-described construction, the edible films of the present invention have excellent strength properties, solubility in hot water, heat sealability and blocking resistance, and are hence suitable for the purpose of packaging food materials.

Now, the processes for producing edible films in accordance with the present invention will be described hereinbelow.

A film layer can be formed by preparing an aqueous solution containing a polysaccharide used as the principal component of the film layer, casting the aqueous solution into a film, and drying the film. The concentration of the polysaccharide in the aqueous solution is preferably not greater than 20% by weight and more preferably not greater than 10% by weight. If the concentration of the polysaccharide is greater than 20% by weight, it becomes difficult to dissolve the polysaccharide completely.

If it is desired to use a polyhydric alcohol, the weight ratio of the polyhydric alcohol to water may be suitably determined so that the weight ratio of polyhydric alcohol to polysaccharide in the film layer will be in the range from 1:5 to 1:1. However, the weight ratio of the polyhydric alcohol to water usually ranges from 0.2:99.8 to 20:80. In this case, the same procedure as described above may be followed, except that the polysaccharide is dissolved in the aqueous solution of the polyhydric alcohol. If it is desired to incorporate other additives in the film layer, they may be suitably added to the above aqueous solution beforehand.

In preparing an aqueous solution of the polysaccharide, it is preferable to promote the dissolution by heating at 70° C. or above. If necessary, the dissolution can also be promoted by allowing the polysaccharide to swell in water beforehand. The pH of the aqueous solution may usually be in the range of about 6-9. However, for polysaccharides (such as alginic acid) whose dissolution is promoted in the alkaline pH range, the pH of the aqueous solution can be made more alkaline. Depending on the type of the polysaccharide, the aqueous solution can also be adjusted to a pH range in which it has good thermal stability.

In order to form a film layer, the resulting aqueous solution of the polysaccharide is defoamed, cast on a carrier (for example, a drum, steel belt, polytetrafluoroethylene-impregnated glass fabric, or plastic film or sheet) to a predetermined thickness, and dried from the carrier side, as by electrical heating, hot air or infrared radiation, so that the water content of the film layer is not greater than 25% by weight and preferably not greater than 20% by weight. The film layer so formed can be continuously wound in roll form without suffering any appreciable blocking.

When the film layer is dried, substantially the whole amount of the polyhydric alcohol remains in the film layer without undergoing any appreciable evaporation. Accordingly, the concentration of the aqueous solution of polyhydric alcohol may be determined in consideration of the concentration of the polysaccharide to be dissolved therein and the desired ratio of polyhydric alcohol to polysaccharide.

In order to form a subfilm layer on the film layer obtained in the above-described manner, the film layer may be coated with an aqueous solution of an alkali metal salt of casein, as by spraying, brushing or treansfer from a rotating rubber roller, or dipped in an aqueous solution of an alkali metal salt of casein. Then, the coated or dipped film layer is dried. Alternatively, a subfilm layer containing an alkali metal salt of casein as the principal component may be formed separately and bonded to the film layer by means of water, an edible adhesive (such as starch) or heat. When the subfilm layer is formed on the film layer by coating or dipping, the concentration of the aqueous solution of casein used for this purpose may generally be in the range of about 1 to 5% by weight. When the subfilm layer is formed separately, the same procedure as described for the film layer can be followed. In this case, the concentration of the aqueous solution of casein may be in the range of about 5 to 20% by weight. The coating technique makes it easy to form a subfilm layer only on the sealing surface.

Similarly, a subfilm layer containing soybean protein as the principal component may be formed by coating the above-described film layer with, or dipping it in, an aqueous solution containing soybean protein or a combination of soybean protein and gelatin, and then drying the coated or dipped film layer. Alternatively, a subfilm layer may be separately formed from an aqueous solution containing soybean protein or a combination of soybean protein and gelatin, superposed on the film layer and bonded thereto by means of water, an edible adhesive or heat.

Again, the subfilm layer is preferably dried to such an extent as to give a water content of not greater than 25% by weight and more preferably not greater than 20% by weight.

Now, food containing and packaging bags made of the edible films of the present invention will be described hereinbelow.

The edible films of the present invention have excellent heat sealability, inclusive of impulse sealability, as well as good water resistance, low-temperature resistance, oil resistance and the like. Accordingly, they can be widely used as bags for containing a variety of foods including powdery or granular foods such as instant soup and instant coffee, dry solid foods such as dried vegetables and other ingredients, oily foods such as flavoring oil, instant foods for cold storage, and the like, and can be used with various instant foods such as cup noodles and precooked noodles. Moreover, they can also be used as casings for ham and sausage. Owing to their excellent heat sealability and impulse sealability, they can be made into various common types of bags including four-side sealed bags, three-side sealed bags, back sealed bags, gusseted bags and the like. Moreover, they can readily be formed into stick-like and other casings. Where a subfilm layer is used, it may be formed only in the heat-sealing regions. Furthermore, since the edible films of the present invention also have excellent printability, they can be printed with an edible ink as desired. Since various properties of the edible films of the present invention depend on the presence or absence and type of the subfilm layer, the content and type of the polyhydric alcohol, the type of the polysaccharide, the water content and the like, they should be suitably chosen according to the desired form of use.

The present invention is further illustrated by the following examples.

A first group of examples (Examples 1-3 and Comparative Examples 1-3) are concerned with the basic embodiment of the edible film of the present invention in which no subfilm layer is included (hereinafter referred to as type A).

In these examples, the film wound on a paper tube was evaluated by cutting samples out of the film and measuring their properties at room temperature according to the following procedures. All parts are by weight.

Tensile strength and elongation: These were measured according to JIS Z1707.

Heat-seal strength: Using a Fuji Impulse Polysealer 210E, heat healing was performed at level 7. Then, heat-seal strength was measured according to JIS Z0238.

Piecing strength: This was measured according to JAS (Standards for Retort Pouches).

Blocking resistance: The film wound on a paper tube was unwound by hand. The blocking resistance of the film was rated as "Superior" when the film could be unwound without resistance; as "Good" when slight resistance was encountered, but the film could be unwound without difficulty; or as "Poor" when strong resistance was encountered and the film was broken or otherwise damaged.

Solubility in hot water: A 3 cm × 3 cm pouch having 2 g of sugar sealed therein was made by heat sealing. This pouch was put into 200 g of hot water at 80° C., followed by gentle stirring with a glass rod. The solubility of the pouch in hot water was rated as "Good" when the pouch was completely dissolved within 3 minutes, or as "Poor" when insoluble matter remained after 3 minutes.

EXAMPLE 1 type A

Seven parts of potassium kappa-carrageenan was dispersed in a mixture composed of 3 parts of glycerol and 100 parts of water. This dispersion was heated to 85° C. and stirred for 60 minutes to dissolve the carrageenan. The resulting solution was defoamed under reduced pressure while being held at 85° C., and continuously cast on a drum heated by circulating therethrough hot water at 95° C. After staying on the drum for 4 minutes, the resulting film was wound on a paper tube. This film had a water content of 16% and a thickness of 49 μm. The weight ratio of polysaccharide to polyhydric alcohol was 7:3.

The releasability of the film from the drum and its windability on a paper tube were both good.

Film properties are shown in Table 1.

EXAMPLE 2 type A

The procedure of Example 1 was repeated except that a mixture composed of 6 parts of sorbitol and 100 parts of water was used as the aqueous solution of polyhydric alcohol. Thus, there was obtained a film having a water content of 14% and a thickness of 47 μm. The weight ratio of polysaccharide to polyhydric alcohol was 7:6.

The releasability of the film from the drum and its windability on a paper tube were both good.

Film properties are shown in Table 1.

EXAMPLE 3 type A

The procedure of Example 1 was repeated except that a mixture composed of 5 parts of potassium kappa-carrageenan and 2 parts of tamarind gum was used as the polysaccharide and a mixture composed of 4 parts of glycerol and 100 parts of water was used as the aqueous solution of polyhydric alcohol. Thus, there was obtained a film having a water content of 15% and a thickness of 50 μm. The weight ratio of polysaccharide to polyhydric alcohol was 7:4.

The releasability of the film from the drum and its windability on a paper tube were both good.

Film properties are shown in Table 1.

COMPARATIVE EXAMPLE 1

The procedure of Example 1 was repeated except that the film was allowed to stay on the heating drum for 3 minutes. Thus, there was obtained a film having a water content of 28% and a thickness of 55 μm. The releasability of the film from the heating drum was good, but its blocking tendency was marked. As a result, a large number of wrinkles were produced during its winding. Film properties are shown in Table 1.

COMPARATIVE EXAMPLE 2

The procedure of Example 1 was repeated except that a mixture composed of 8 parts of glycerol and 100 parts of water was used as the aqueous solution of polyhydric alcohol. Thus, there was obtained a film having a water content of 18% and a thickness of 51 μm. The weight ratio of polysaccharide to polyhydric alcohol was 7:8.

The releasability of the film from the heating drum was good, but its blocking tendency was marked. As a result, a large number of wrinkles were produced during its winding. Film properties are shown in Table 1.

COMPARATIVE EXAMPLE 3

The procedure of Example 1 was repeated except that a mixture composed of 1 part of glycerol and 100 parts of water was used as the aqueous solution of polyhydric alcohol. Thus, there was obtained a film having a water content of 14% and a thickness of 47 μm. The weight ratio of polysaccharide to polyhydric alcohol was 7:1.

In forming this film, it was difficult to adjust the dryness of the film, and breakage of the film frequently occurred during its release from the drum. Moreover, its heat sealability was less than satisfactory.

TABLE 1

|  | Tensile strength (kg/mm²) | Elongation (%) | Piercing strength (kg) | Heat-seal strength (kg/1.5 cm) | Blocking resistance | Solubility in hot water |
| --- | --- | --- | --- | --- | --- | --- |
| Example 1 | 3.9 | 65 | 0.88 | 0.21 | Superior | Good |
| Example 2 | 3.0 | 95 | 0.62 | 0.20 | Good | Good |
| Example 3 | 3.1 | 83 | 0.70 | 0.24 | Good | Good |
| Comparative Example 1 | 2.2 | 170 | 0.36 | 0.25 | Poor | Good |
| Comparative Example 2 | 2.3 | 155 | 0.35 | 0.27 | Poor | Good |
| Comparative Example 3 | 4.1 | 12 | 0.90 | 0.04 | Superior | Good |

The following examples (Examples 4-9 and Comparative Examples 4 and 5) are concerned with an embodiment consisting of a film layer containing a mixture of a polyhydric alcohol being liquid at room temperature and a polyhydric alcohol being solid at room temperature, and having no subfilm layer (hereinafter referred to as type B).

In these examples, tensile strength, elongation and piercing strength were measured at room temperature by using samples which had been cut out of the film wound on a paper tube and allowed to stand in an atmosphere maintained at 20° C. and 65% RH for 24±1 hours. Low-temperature resistance, heat-seal strength and solubility in hot water were measured by cutting samples out of the film and using them directly. The rating systems for heat-seal strength, blocking resistance and solubility in hot water were the same as employed in Examples 1-3.

Tensile strength and elongation: These were measured according to JIS Z1707.

Low-temperature resistance: A film sample measuring 5 cm × 10 cm was allowed to stand in an atmosphere at −45° C. for an hour, and then folded. The low-temperature flexibility of the sample was rated as "Good" when the sample was not cracked, or as "Poor" when the sample was cracked.

Piecing strength: This was measured according to JAS (Standards for Retort Pouches).

EXAMPLE 4 type B

Seven parts of potassium kappa-carrageenan was dispersed in a mixture composed of 3 parts of glycerol, 2 parts of sorbitol and 100 parts of water. This dispersion was heated to 85° C. and stirred for 60 minutes to dissolve the carrageenan. The resulting solution was defoamed under reduced pressure while being held at 85° C., and continuously cast on a drum heated by circulating therethrough hot water at 95° C. After staying on the drum for 4 minutes, the resulting film was wound on a paper tube. This film had a water content of 16% and a thickness of 50 μm. The weight ratio of polysaccharide to polyhydric alcohol was 7:5.

The releasability of the film from the drum and its windability on a paper tube were both good.

Film properties are shown in Table 2.

EXAMPLE 5 type B

The procedure of Example 4 was repeated except that a mixture composed of 2 parts of glycerol, 3 parts of sorbitol and 100 parts of water was used as the aqueous solution of polyhydric alcohol. Thus, there was obtained a film having a water content of 14% and a thickness of 48 μm. The weight ratio of polysaccharide to polyhydric alcohol was 7:5.

The releasability of the film from the drum and its windability on a paper tube were both good.

Film properties are shown in Table 2.

EXAMPLE 6 type B

The procedure of Example 4 was repeated except that a mixture composed of 3 parts of potassium kappa-carrageenan and 1 part of locust bean gum was used as the polysaccharide and a mixture composed of 2 parts of glycerol, 1 part of sorbitol and 100 parts of water was used as the aqueous solution of polyhydric alcohol. Thus, there was obtained a film having a water content of 15% and a thickness of 47 μm. The weight ratio of polysaccharide to polyhydric alcohol was 4:3.

The releasability of the film from the drum and its windability on a paper tube were both good.

Film properties are shown in Table 2.

EXAMPLE 7 type A

The procedure of Example 4 was repeated except that a mixture composed of 5 parts of glycerol and 100 parts of water was used as the aqueous solution of polyhydric alcohol. Thus, there was obtained a film having a water content of 16% and a thickness of 48 μm. The weight ratio of polysaccharide to polyhydric alcohol winding. This was due to the excessiveness of the polyhydric alcohol content.

Properties of the film are shown in Table 2.

TABLE 2

|  | 20° C., 65% RH | | | 20° C., 90% RH | | | Low-temperature resistance | Heat-seal strength (kg/1.5 cm) | Solubility in hot water |
|---|---|---|---|---|---|---|---|---|---|
|  | Tensile strength (kg/mm²) | Elongation (%) | Piercing strength (kg) | Tensile strength (kg/mm²) | Elongation (%) | Piercing strength (kg) |  |  |  |
| Example 4 | 3.1 | 97 | 0.70 | 2.3 | 105 | 0.52 | Good | 0.25 | Good |
| Example 5 | 3.2 | 92 | 0.71 | 2.3 | 102 | 0.55 | Good | 0.22 | Good |
| Example 6 | 3.8 | 62 | 0.85 | 3.0 | 84 | 0.69 | Good | 0.23 | Good |
| Example 7 | 3.0 | 115 | 0.68 | 1.4 | 118 | 0.28 | Good | 0.25 | Good |
| Example 8 | 3.3 | 88 | 0.75 | 2.6 | 120 | 0.57 | Poor | 0.20 | Good |
| Example 9 | 4.0 | 56 | 0.94 | 3.1 | 84 | 0.68 | Poor | 0.17 | Good |
| Comparative Example 4 | 3.7 | 35 | 0.92 | 3.2 | 69 | 0.66 | Poor | 0.03 | Good |
| Comparative Example 5 | 2.3 | 150 | 0.33 | 1.0 | 135 | 0.21 | Good | 0.25 | Good | was 7:5.

Properties of the film thus obtained are shown in Table 2.

EXAMPLE 8 type A

The procedure of Example 4 was repeated except that a mixture composed of 5 parts of sorbitol and 100 parts of water was used as the aqueous solution of polyhydric alcohol. Thus, there was obtained a film having a water content of 15% and a thickness of 47 μm. The weight ratio of polysaccharide to polyhydric alcohol was 7:5.

Properties of the film thus obtained are shown in Table 2.

EXAMPLE 9

The procedure of Example 4 was repeated except that a mixture composed of 3 parts of sorbitol and 100 parts of water was used as the aqueous solution of polyhydric alcohol. Thus, there was obtained a film having a water content of 14% and a thickness of 46 μm. Its properties are shown in Table 2.

COMPARATIVE EXAMPLE 4

The procedure of Example 4 was repeated except that a mixture composed of 0.5 part of glycerol and 0.5 part of sorbitol was used as the polyhydric alcohol. Thus, there was obtained a film having a water content of 14% and a thickness of 45 μm. The weight ratio of polysaccharide to polyhydric alcohol was 7:1. However, it was difficult to adjust the dryness of the film. Moreover, breakage of the film frequently occurred during its release from the drum. This was due to the insufficiency of the polyhydric alcohol content.

Properties of the film are shown in Table 2.

COMPARATIVE EXAMPLE 5

The procedure of Example 4 was repeated except that a mixture composed of 4 parts of glycerol, 4 parts of sorbitol and 100 parts of water was used as the aqueous solution of polyhydric alcohol. Thus, there was obtained a film having a water content of 17% and a thickness of 51 μm. The weight ratio of polysaccharide to polyhydric alcohol was 7:8. When this film was formed, its releasability from the heating drum was good, but its blocking tendency was marked. As a result, a large number of wrinkles were produced during The following examples (Example 10 and Comparative Examples 6-9) are concerned with an embodiment having a subfilm layer formed by using an alkali metal salt of casein (hereinafter referred to as type C).

Various properties were measured at room temperature according to the following procedures.

Heat-seal strength: Using a Fuji Impulse Polysealer 210E, heat sealing was performed at levels 1-6. Then, heat-seal strength was measured according to JIS Z0238.

Blocking resistance: Two samples, 1.5 cm wide and 10 cm long, were cut out of a film to be tested. One of them was superposed on the other so that their subfilm layers came into contact. In one half (1.5 cm wide and 5 cm long) of the contact area, a piece of paper was interposed between the samples to prevent them from blocking. This sample assembly was placed under a load of 70 g/cm² and allowed to stand in an atmosphere maintained at 20° C. and 65% RH for 24±1 hours. Thereafter, the sample assembly was removed and its 180° peel strength at a width of 1.5 cm was measured by pulling the samples apart at a rate of 5 cm/min.

EXAMPLE 10 type C

Seven parts of potassium kappa-carrageenan was dispersed in a mixture composed of 4 parts of glycerol and 100 parts of water. This dispersion was heated to 85° C. and stirred for 60 minutes to dissolve the carrageenan. The resulting solution was defoamed under reduced pressure while being held at 85° C., cast on a flat plate of stainless steel, and then dried in hot air to obtain a film having a water content of 15% and a thickness of 48 μm. The weight ratio of polysaccharide to polyhydric alcohol was 7:4. Then, a 5% aqueous solution of sodium caseinate was applied onto only one surface of the above film and dried in hot air again to obtain a film having a water content of 15% and a thickness of 49 μm.

For purposes of comparison, the film obtained before application of the aqueous solution of sodium caseinate (and corresponding to type A) was also evaluated (Example 10').

The heat-seal strength and blocking resistance of these films were measured. The results thus obtained are shown in Table 3.

COMPARATIVE EXAMPLES 6-9

The film which had been obtained in Example 10 before application of the aqueous solution of sodium caseinate was used in these comparative examples. Aqueous solutions containing 5% each of gelatin (Comparative Example 6), pullulan (Comparative Example 7), gum arabic (Comparative Example 8) and corn starch (Comparative Example 9) were separately applied onto the above film and dried in hot air. Then, the heat-seal strength and blocking resistance of the resulting laminated films were meansured. The results thus obtained are shown in Table 3.

TABLE 3

| | Heat-seal strength (kg/1.5 cm) | | | | | | Blocking resistance |
|---|---|---|---|---|---|---|---|
| | 1 | 2 | 3 | 4 | 5 | 6 | (g/1.5 cm) |
| Example 10 | 0 | 0 | 0.71 | 0.66 | 0.68 | 0.60 | 1.0 |
| Example 10' | 0 | 0 | 0 | 0 | 0.14 | 0.16 | 1.0 |
| Comparative Example 6 | 0.12 | 0.37 | 0.67 | 0.61 | 0.58 | 0.62 | 170 |
| Comparative Example 7 | 0 | 0 | 0 | 0.17 | 0.24 | 0.23 | N.M.* |
| Comparative Example 8 | 0 | 0 | 0.14 | 0.17 | 0.20 | 0.21 | N.M.* |
| Comparative Example 9 | 0 | 0.06 | 0.12 | 0.16 | 0.18 | 0.18 | N.M.* |

*N.M. = Not measured

The following examples (Examples 11-13 and Comparative Examples 10-13) are concerned with an embodiment having a subfilm layer formed by using soybean protein or a combination of soybean protein and gelatin (hereinafter referred to as type D).

In these examples, heat-seal strength and blocking resistance were measured in the same manner as in Example 10. Moreover, an organoleptic test for odor was performed according to the following procedure.

Organoleptic test for odor: Samples measuring 10 cm × 10 cm were cut out of a film to be tested, and smelled by five panelists. Each panelist rated the sample at 1 when he felt the odor of its coating material, or at 0 when he felt no odor. Then, the film was ranked on the following basis:

0-1 = No odor (designated as "No" in Table 1).
2-3 = Slight odor (designated as "Slight" in Table 1).
4-5 = Appreciable odor (designated as "Appreciable" in Table 1).

EXAMPLE 11 type D

Seven parts of potassium kappa-carrageenan was dispersed in a mixture composed of 4 parts of glycerol and 100 parts of water. This dispersion was heated to 85° C. and stirred for 60 minutes to dissolve the carrageenan. The resulting solution was defoamed under reduced pressure while being held at 85° C., cast on a flat plate of stainless steel, and then dried in hot air to obtain a film having a water contant of 15% and a thickness of 48 μm. The weight ration of polysaccharide to polyhydric alcohol was 7:4. Then, a 5.0% aqueous solution of soybean protein (Fujipro R; manufactured by Fuji Oil Manufacturing Co., Ltd.) was applied onto the whole surface on only one side of the above film and dried in hot air again to obtain a film having a water content of 15% and a thickness of 49 μm and exhibiting excellent strength properties. The heat-seal strength and blocking resistance of this film were measured and, moreover, this film was subjected to an organoleptic test for odor. The results thus obtained are shown in Table 4.

For purposes of comparison, properties of the film obtained before application of the aqueous solution of soybean protein (and corresponding to type A) were evaluated in the same manner as described above (Example 11'). The results thus obtained are also shown in Table 4.

EXAMPLE 12 TYPE D

The film which had been obtained in Example 11 before application of the aqueous solution of soybean protein was used in this example. An aqueous solution containing 2.5% of soybean protein (Fujipro R) and 2.5% of gelatin (S-4; manufactured by Nitta Gelatin Co., Ltd.) was applied onto the above film and dried in hot air to obtain a film having a water content of 15% and a thickness of 49 μm and exhibiting excellent strength properties. This film was evaluated in the same manner as in Example 11. The results thus obtained are shown in Table 4.

EXAMPLE 13 TYPE D

Three parts of potassium kappa-carrageenan and 1 part of purified locust bean gum were dispersed in a mixture composed of 2 parts of glycerol, 1 part of sorbitol and 100 parts of water. This dispersion was heated to 85° C. and stirred for 60 minutes to dissolve the carrageenan and the locust bean gum. Using the resulting solution, the procedure of Example 11 was repeated to obtain a film having a water contant of 15% and a thickness of 47 μm. Then, a 3.0% aqueous solution of soybean protein was applied onto one surface of the above film and dried in hot air again to obtain a film having a water content of 15% and a thickness of 47.6 μm and exhibiting excellent strength properties. Properties of this film were evaluated in the same manner as in Example 11. Moreover, for purposes of comparison, the film obtained before application of the aqueous solution of soybean protein (and corresponding to type A) were also evaluated. The results thus obtained are shown in Table 4.

COMPARATIVE EXAMPLES 10-13

The film which had been obtained in Example 11 before application of the aqueous solution of soybean protein was used in these comparative examples. Aqueous solutions containing 5% each of gelatin (Comparative Example 10), pullulan (Comparative Example 11), gum arabic (Comparative Example 12) and corn starch (Comparative Example 13) were separately applied onto the above film and dried in hot air. Then, properties of the resulting films were evaluated in the same manner as in Example 11. The results thus obtained are shown in Table 4. Moreover, for purposes of reference, an aqueous solution of sodium caseinate was applied to the above film (Reference Example). The results of evaluation of the resulting film (corresponding to type C) are also shown in Table 4.

TABLE 4

|  | Heat-seal strength (kg/1.5 cm) | | | | | | Blocking resistance | |
| --- | --- | --- | --- | --- | --- | --- | --- | --- |
|  | 1 | 2 | 3 | 4 | 5 | 6 | (g/1.5 cm) | Odor |
| Example 11 | 0 | 0 | 0.58 | 0.68 | 0.65 | 0.57 | 0.2 | No |
| Example 11' | 0 | 0 | 0 | 0 | 0.14 | 0.16 | 1.0 | — |
| Example 12 | 0 | 0.11 | 0.67 | 0.69 | 0.59 | 0.58 | 1.6 | No |
| Example 13 | 0 | 0 | 0.46 | 0.49 | 0.55 | 0.49 | 0.2 | No |
| Example 13' | 0 | 0 | 0 | 0 | 0.09 | 0.15 | 1.0 | — |
| Comparative Example 10 | 0.12 | 0.37 | 0.67 | 0.61 | 0.58 | 0.62 | 170 | No |
| Comparative Example 11 | 0 | 0 | 0 | 0.17 | 0.24 | 0.23 | — | No |
| Comparative Example 12 | 0 | 0 | 0.14 | 0.17 | 0.20 | 0.21 | — | Slight |
| Comparative Example 13 | 0 | 0.06 | 0.12 | 0.16 | 0.18 | 0.18 | — | Slight |
| Reference example | 0 | 0 | 0.71 | 0.66 | 0.68 | 0.60 | 1.0 | Appreciable |

Although the invention has been described with reference to preferred embodiments, it is to be understood that variations and modifications will be apparent to those skilled in the art and are included within the invention. Such variations and modifications are to be considered within the purview and the scope of the claims appended hereto.

What is claimed is:

1. A heat-sealable edible film comprising at least a film layer consisting essentially of (1) a water-soluble polysaccharide composed chiefly of carrageenan, (2) a polyhydric alcohol and (3) water, the film layer having a water content of not greater than 25% by weight, the weight ratio of the polyhydric alcohol to the water-soluble polysaccharide being in the range from 1:5 to 1:1.

2. An edible film as claimed in claim 1 wherein the polyhydric alcohol is a mixture of a polyhydric alcohol being liquid at room temperature and a polyhydric alcohol being solid at room temperature.

3. An edible film as claimed in claim 2 wherein the polyhydric alcohol being liquid at room temperature and the polyhydric alcohol being solid at room temperature are used in a weight ratio ranging from 3:1 to 1:3.

4. An edible film as claimed in claim 1 which further comprises a subfilm layer formed on at least one surface of the film layer, the subfilm layer containing an alkali metal salt of casein, soybean protein or a combination of soybean protein and gelatin, as the principal component.

5. An edible film as claimed in claim 1 wherein the polyhydric alcohol comprises one or more substances selected from the group consisting of dihydric alcohols, trihydric alcohols, sugar alcohols, monosaccharides, disaccharides, and oligosaccharides.

6. An edible film as claimed in claim 1 wherein the polyhydric alcohol comprises one or more substances selected from the group consisting of ethylene glycol, propylene glycol, glycerol, sorbitol, mannitol, maltitol, xylitol, saccharification products of reduced starch, glucose, fructose, galactose, xylose, saccharose, maltose, lactose, and decomposition products of starch.

7. An edible film as claimed in claim 1 wherein the film layer has a thickness of 10 to 100 μm.

8. A process for producing an edible film as claim in claim 1, comprising the steps of preparing an aqueous solution of a polyhydric alcohol in which the polyhydric alcohol and water are present in a weight ratio ranging from 0.2:99.8 to 20:80, dissolving therein a water-soluble polysaccharide composed chiefly of carrageenan, casting the resulting solution into a film, and drying the film to reduce its water content to 25% by weight or less.

9. A process for producing an edible film as claim in claim 3, comprising the steps of preparing an aqueous solution of a polyhydric alcohol in which the polyhydric alcohol and water are present in a weight ratio ranging from 0.2:99.8 to 20:80 and in which the polyhydric alcohol is a mixture of a polyhydric alcohol being liquid at room temperature and a polyhydric alcohol being solid at room temperature, dissolving therein a water-soluble polysaccharide composed chiefly of carrageenan, casting the resulting solution into a film, and drying the film to reduce its water content to 25% by weight or less.

10. A process as claimed in claim 8 or 9 wherein the step of preparing the aqueous solution by dissolving the water-soluble polysaccharide is carried out at a temperature of 70° C. or above.

11. A food bag for packaging powdered foods, granular foods, dry solid foods and oily foods which has been made by using an edible film as claimed in claim 1.

* * * * *